Patented May 17, 1938

2,117,776

UNITED STATES PATENT OFFICE 2,117,776

PURIFICATION OF SOY BEAN OIL

Arthur O. Tischer, Rochester, N. Y., assignor to Eastman Kodak Company, Rochester, N. Y., a corporation of New Jersey No Drawing. Application March 5, 1937, Serial No. 129,254. In Great Britain December 24, 1936

16 Claims. (Cl. 87—12)

This invention relates to improvements for the purification of soy bean oil and more particularly to effective methods for producing a purified soy bean oil by vacuum distillation.

Soy bean oil is used extensively for the preparation of weather resistant paints. Its use for edible purposes has increased, but various difficulties in its purification have prevented its general use in this field. Soy bean oil when purified, using known methods, soon acquires a "grassy" or paint-like flavor, due apparently to constituents contained in the oil which are not removed by the purification treatment or to other constituents which become oxidized forming products of rancidity which destroy the value of the oil. Since the use of soy bean oil for edible purposes depends upon the elimination of odor and rancidity many attempts have been made to permanently overcome these disturbing factors, but with little success.

This invention has for its object to overcome the above difficulties of soy bean oil purification. Another object is to provide a process whereby a bland purified soy bean oil can be prepared. Another object is to provide a process for producing a purified soy bean oil which will not develop a rancid or other undesirable flavor over a considerable period of time. A further object is to provide a process for the purification of soy bean oil by high vacuum distillation. Other objects will appear hereinafter.

These and other objects are accomplished in accordance with my invention by subjecting the soy bean oil, to a treatment which will remove phospholipids and similar substances and then subjecting the phospholipid-free oil to high vacuum distillation and collecting the purified oil as a distillate.

In attempting to distill soy bean oil under high vacuum, it was found that a considerable amount of gas was given off as soon as the oil was heated on the vaporizing surface. So much gas was disengaged that the high vacuum could not be maintained in the still and distillation occurred at a very slow rate with considerable decomposition giving a low yield of poor quality. Investigation showed that phospholipids and similar impurities in the oil were responsible for the gas formation, these substances being substantially decomposed into permanent gases or high vapor pressure decomposition products at the temperature of the condensing surface. It was found that a soy bean oil from which such substances had been removed could be easily distilled in the same manner without troublesome formation of gas or thermal decomposition and that a pure bland soy bean oil of excellent properties could be recovered as a distillate.

In carrying out my invention I first subject the soy bean oil to be distilled to a suitable treatment to remove phospholipids, such as lecithin and cephalin and related substances. A preferred method of removing these materials is to add to the oil, a material which is a solvent for the oil, but which is a nonsolvent for the phospholipids and other impurities to be removed. Due to the decreased solubility of the impurities in the diluted oil, they precipitate and can be removed by decanting, filtration or other similar expedients. The addition of an electrolite, such as magnesium or calcium chloride, increases the amount of precipitate formed. The oil separated from the precipitate is treated to remove the added solvent and is then subjected to high vacuum distillation. Acetone is an example of a suitable solvent for the oil, but non-solvent for the phospholipids. When a solvent of high vapor pressure is employed its removal after precipitation of lecithin, etc. can be easily accomplished by distilling under a moderate vacuum.

Another suitable method of removing the lecithin and related materials is to treat the soy bean oil with steam until an emulsion is formed. The emulsion is then centrifuged in a high speed centrifuge, the separated oil then being dried and subjected to high vacuum distillation. The lecithin can be recovered from the aqueous medium. This method is advantageous since the precipitated impurities can be treated in a relatively simple manner to yield an especially good grade of lecithin as a by-product. Lecithin may also be recovered from the precipitated impurities where other methods of removal are employed, such as the solvent precipitation method described above.

In the subsequent distillation the oil is distilled under high vacuum conditions and it is preferable to operate in such a way that a plurality of fractions can be segregated. It is especially desirable to segregate a first fraction which usually contains most of the sterols, sterol esters, sterolines, residual phospholipids and practically all of the odoriferous materials present in the oil. This fraction can be subjected to treatment to remove sterols, such as stigmasterol, which is in great demand for the production of sex hormones. It is also desirable to collect a small second fraction coming over at a slightly higher temperature than the first fraction. This prevents any residual portions of odoriferous materials from being collected with the main fractions. The remaining oil is then collected as a single fraction or may be segregated into a plurality of fractions having slightly different characteristics, such as iodine, number, etc. This procedure, of course, is preferred but a purified oil of improved quality can be obtained by collecting the bulk of the distillate as one fraction.

The distillation is carried out under a pressure of below about 1 mm. and preferably below about .1 mm., such as at pressures between about .05 and .0001 mm. The lowest pressure obtainable enables the highest rate of distillation, but, due to the fact that such pressures are difficult to produce and maintain, it is preferable to operate at pressures of about .02 to .001 mm. It is desirable to condense the evaporating molecules upon a condenser which is of similar area to the evaporating surface and is located at a short distance therefrom. Such types of distillation are known as high vacuum short-path distillation. When the distance between the evaporating and condensing surface is less than about the mean free path, the distillation is known as molecular and it is preferred to operate under such conditions. Molecular distillation conditions are well known and reference is made to the Hickman Patents 1,925,559 and 1,942,858, Burch 1,955,321 and Washburn "Bureau of Standards of Research," vol. 2, 1929, page 477, for a more complete description of such processes.

Temperatures of between about 150° and 325° C. can be used. The lower temperatures result in a rather slow rate of distillation, while temperatures in the neighborhood of 325° and above cause considerable decomposition. It is, therefore, desirable to operate at intermediate temperatures, such as between 175° and 275° C. and preferably between 200° and 250° C.

Example

One gallon of soy bean oil is added to twice the volume of acetone under constant stirring. A precipitate forms immediately which can be filtered off and used for the preparation of lecithin. Addition of 20 cc. of a saturated alcoholic solution of magnesium chloride makes the precipitation of lecithin more complete. The solution of oil and acetone is removed from the precipitate, filtered, and the acetone distilled off in a solvent recovery still. The lecithin-free oil is then transferred to a molecular still and subjected to distillation at a pressure maintained between 1 and 20 microns. The temperature of the different distilling columns is regulated in such a manner that the following cuts may be taken:

| Fraction | Percent cut | Temperature | Pressure in microns |
|---|---|---|---|
| | | ° C. | |
| 1 | 2 | to 215 | 10 |
| 2 | 5 | 220 | 4 |
| 3 | 20 | 232 | 2 |
| 4 | 70 | 240 | 2 |
| Residue | 3 | | |

The first fraction consists mainly of sterols, small amounts of phospholipids, if their removal was incomplete, and the largest part of the odoriferous materials. The second fraction contains any residual amounts of odoriferous materials and may be returned to the still for retreatment or be mixed with the next batch of oil to be distilled. The third and fourth fractions representing about 90% of the oil are practically free of odor of any kind and can be used in any field in which a purified bland soy bean oil is required. These fractions are edible and do not develop a "grassy" or undesirable taste or odor on exposure to atmosphere, even over long periods of time.

What I claim is:

1. The process which comprises removing phospholipids from soy bean oil and then subjecting the oil to high vacuum-short path distillation.

2. The process which comprises removing phospholipids from soy bean oil and subjecting the oil to short path distillation at a pressure below about .01 mm.

3. The process which comprises removing phospholipids and related substances from soy bean oil and subjecting the oil to molecular distillation.

4. The process which comprises adding to soy bean oil a liquid which is a solvent for the oil, but a non-solvent for phospholipids, separating the precipitate formed, removing the liquid solvent from the oil and subjecting the oil to high vacuum short path distillation.

5. The process of purifying soy bean oil which comprises adding to the oil a liquid which is a solvent for the oil but a non-solvent for the phospholipids contained in the oil, separating the oil-liquid mixture from the precipitated phospholipids, separating the liquid from the oil, subjecting the oil to short path distillation at a pressure below about .01 mm. and segregating a plurality of fractions, a small fraction containing most of the odoriferous materials being collected first.

6. The process of purifying soy bean oil which comprises adding to the oil a liquid which is a solvent for the oil, but which is a non-solvent for the phospholipids, removing the oil-solvent mixture from the precipitate, separating the liquid solvent from the oil and then subjecting the oil to molecular distillation.

7. The process of purifying soy bean oil which comprises adding to the oil an electrolite and a liquid which is a solvent for the oil, but a non-solvent for the phospholipids, removing the oil-liquid solvent mixture from the precipitated phospholipids, separating the liquid solvent from the oil, subjecting the oil to short path distillation at a pressure below .01 mm. and collecting a plurality of fractions of the oil as a distillate, the first fraction being one which contains the odoriferous constituents of the oil.

8. The process which comprises adding acetone to soy bean oil in order to precipitate phospholipids, separating the mixture of oil and acetone from the precipitated phospholipids, removing acetone from the oil, and subjecting the oil to high vacuum-short path distillation.

9. The process which comprises adding acetone to soy bean oil in order to precipitate phospholipids, separating the mixture of oil and acetone from the precipitated phospholipids, removing acetone from the oil, and subjecting the oil to molecular distillation.

10. The process of purifying soy bean oil which comprises adding an electrolite and acetone to the oil in order to precipitate phospholipids, separating the mixture of oil and acetone from the precipitate, removing acetone from the oil and subjecting the oil to high vacuum-short path distillation.

11. The process of purifying soy bean oil which comprises adding an electrolite and acetone to the oil in order to precipitate phospholipids, separating the mixture of oil and acetone from the precipitate, removing acetone from the oil and subjecting the oil to high vacuum short path distillation at below .01 mm. and collecting a plurality of fractions, the first fraction being of such volume that it contains practically all of the odoriferous constituents present in the oil distilled.

12. The process of purifying soy bean oil which comprises adding an electrolite and acetone to the oil in order to precipitate phospholipids, separating the mixture of oil and acetone from the precipitate, removing acetone from the oil and subjecting the oil to molecular distillation.

13. The process which comprises adding acetone and magnesium chloride to soy bean oil in order to precipitate phospholipids contained in the oil, separating the mixture of oil and acetone from the precipitate, removing the acetone from the oil and subjecting the oil to high vacuum-short path distillation.

14. The process which comprises adding acetone and magnesium chloride to soy bean oil in order to precipitate phospholipids contained in the oil, separating the mixture of oil and acetone from the precipitate, removing the acetone from the oil and subjecting the oil to molecular distillation.

15. The process of purifying soy bean oil which comprises treating the oil with steam until an emulsion has formed, centrifuging the emulsion to separate the oil from the precipitated impurity, removing residual water from the oil and subjecting the oil to high vacuum short path distillation.

16. The process of purifying soy bean oil which comprises treating the oil with steam until an emulsion has formed, centrifuging the emulsion to separate the oil from the precipitated impurity, removing residual water from the oil and subjecting the oil to molecular distillation.

ARTHUR O. TISCHER.